(12) United States Patent
Liao et al.

(10) Patent No.: US 8,427,114 B2
(45) Date of Patent: Apr. 23, 2013

(54) APPARATUS FOR CONTROLLING LED INDICATOR OF CHARGING STATUS AT THE PRIMARY CONTROL SIDE OF AN AC-DC POWER CHARGER

(75) Inventors: Weiming Liao, Shenzhen (CN);
Matthew Man Ho Ku, Irvine, CA (US);
Yue Zheng, Shenzhen (CN)

(73) Assignee: Evergreen Micro Devices Co., Ltd., Shenzhen (CN)

( * ) Notice: Subject to any disclaimer, the term of this patent is extended or adjusted under 35 U.S.C. 154(b) by 974 days.

(21) Appl. No.: 12/490,120

(22) Filed: Jun. 23, 2009

(65) Prior Publication Data
US 2010/0321193 A1 Dec. 23, 2010

(51) Int. Cl.
*H02J 7/04* (2006.01)
(52) U.S. Cl.
USPC .............. 320/162; 320/107; 340/657
(58) Field of Classification Search .............. 340/657;
320/162, 107–115, 137
See application file for complete search history.

(56) References Cited

U.S. PATENT DOCUMENTS

| | | | | |
|---|---|---|---|---|
| 5,828,966 A * | 10/1998 | Davis et al. | ................... | 455/573 |
| 6,020,832 A * | 2/2000 | Jensen | .......................... | 340/970 |
| 6,075,343 A * | 6/2000 | Hsu | ................................ | 320/134 |
| 6,163,132 A * | 12/2000 | Higuchi et al. | ............... | 320/132 |
| 6,252,511 B1 * | 6/2001 | Mondshine et al. | ....... | 340/636.1 |
| 6,304,060 B1 * | 10/2001 | Dernehl | ....................... | 320/132 |
| 8,063,606 B2 * | 11/2011 | Veselic | ......................... | 320/119 |
| 8,180,584 B2 * | 5/2012 | Raichle et al. | .................. | 702/63 |
| 8,315,693 B2 * | 11/2012 | Lu et al. | ....................... | 600/509 |
| 2008/0174269 A1 * | 7/2008 | DeRome et al. | ............. | 320/110 |

* cited by examiner

*Primary Examiner* — Eric M Blount
(74) *Attorney, Agent, or Firm* — Morris Manning & Martin LLP; Tim Tingkang Xia, Esq.

(57) ABSTRACT

The present invention relates to a charge status indicator and a charger. The charger comprises a charging power supply and a charge status indicator, wherein, the charge status indicator comprises a detecting chip for monitoring charge status connected between the primary winding of transformer and ground, and a display module used for displaying the charge status, wherein, said detecting chip for monitoring charge status comprising: a detecting module for detecting the charging state of the charge power supply; a comparing module for determining the current charge status based on the detected charging state. By employing the charger or the charge status indicator for a charger, a primary-side feedback control Flyback SMPS may be employed, just a simple and reliable circuit is needed, and higher efficient can be achieved.

14 Claims, 10 Drawing Sheets

APPARATUS FOR CONTROLLING LED INDICATOR OF CHARGING STATUS AT THE PRIMARY CONTROL SIDE OF AN AC-DC POWER CHARGER

FIELD OF THE INVENTION

The present invention relates to charge device, and, more specific, to a charger and an apparatus for differentiating between different charging states and indicating a particular charge status to a user.

BACKGROUND OF THE INVENTION

At present, a charge status indicator is always provided on an AC-DC charger for displaying charge status to a user. Traditional AC-DC charger is implemented with secondary-side feedback control Flyback switching mode power supply (SMPS). Charge status indicator used in such traditional AC-DC charger is implemented by a red and green two-color common-cathode LED 223, a PNP transistor 222, a silicon rectifier diode 220 and resistors 219, 221, 224 (referring to FIG. 1).

When the product of the output current Io of VOUT and the resistance of resistors 219, V 219 (that is the voltage drop on the resistors 219), is higher than the VBE (about 0.6 V) of the PNP transistor 222, that is, Io*R 219>0.6V, the PNP transistor 222 is turned on in a saturated mode, and the red LED is lighten. Due to the saturated voltage drop VCE of PNP transistor 222 is about 0.3 V, and the turn on voltage drop of the red LED in LED 223 is about 1.6 V, and the sum of both is about 1.9 V, which is lower than the sum 2.3 V of the voltage drop 0.6V on the resistors 219 and the turn on voltage drop 1.7 V of the green LED in LED 223, that is VCE+VR<V219+VG, so the green LED isn't lighten.

When the product of the output current Io of VOUT and the resistance of resistors 219, V 219 (that is the voltage drop on the resistors 219), is lower than the VBE (about 0.6 V) of the PNP transistor 222, that is, Io*R 219<0.6V, the PNP transistor 222 is turned off, and the green LED is lighten.

However, the said circuit according the prior art is not a good choice for AC-DC charger implemented with primary-side feedback control Flyback SMPS because of the following reasons:

1. When a rated load is outputted, the voltage on capacitor 213 is higher than VOUT for 0.8V-1.0V. If primary-side feedback control Flyback SMPS is employed, which will result in that the no-load voltage of output end will higher than rated load voltage for 0.8-1V. Accordingly such circuit can't be adopted in primary-side feedback control Flyback SMPS, and only can be adopted in secondary-side feedback control Flyback SMPS.

2. As such circuit is used to detect the voltage drop generated when charging current is passing through the resistors 219 and diode 220, which result in low efficiency.

3. Too many electronic components are employed in such circuit, which result in higher costs and lower reliability.

Accordingly, a simple and reliable charge status indicator circuit which can be applied in primary-side feedback control Flyback SMPS.

SUMMARY OF THE INVENTION

The primary objective of this invention is to provide a simple and reliable circuitry for displaying charge status to a user which can be applied in primary-side feedback control Flyback SMPS charger.

The charger according with the present invention comprises a charging power supply and a charge status indicator, the charge status indicator comprises a detecting chip for monitoring charge status connected between the primary winding of transformer and ground, and a display module used for displaying the charge status, wherein, said detecting chip for monitoring charge status comprising:

a detecting module for detecting the charging state of the charge power supply;

a comparing module for determining the current charge status based on the detected charging state.

Advantagely, said detecting chip for monitoring charge status further comprises a display driver for driving the display module to display the charge status based on the current charge status.

Advantagely, said detecting module further comprises:

a frequency obtaining unit for obtaining the working frequency of the detecting chip for monitoring charge status, wherein, the working frequency is proportional to the charging current;

a frequency-electrical signal converter for converting the working frequency to an electrical signal which is proportional to the charging current.

Advantagely, said detecting module further comprises:

a sample and hold circuit for sampling electrical signal from the primary auxiliary winding of the transformer;

an error amplifier for comparing the sample electrical signal with a reference value and outputting an electrical signal which is proportional to the charging current.

Advantagely, said comparing module comprises a comparator and a filter, wherein, the forward input end of the comparator is connected to the detecting module to obtain an electrical signal which is proportional to the charging current; the reverse input end of the comparator is connected to a reference electrical signal, the output end of the comparator is connected to the input end of the filter, and the output end of the filter is connected to the display driver to output the charging state.

Advantagely, said display driver comprises a first driver connected to the output end of the filter for driving the display module to display the first charge status, and a second driver connected to the output end of the filter for driving the display module to display the second charge status.

Advantagely, the display module comprises a first LED driven by the first driver, a second LED driven by the second driver, and a current-limiting resistor connected between the anodes of the first and second LEDs and the power supply.

Advantagely, the first and second LEDs are common-anode LED.

Advantagely, the display module comprises a first LED driven by the first driver, a second LED driven by the second driver, and a current-limiting resistor connected between the cathodes of the first and second LED and the ground.

Advantagely, the first and second LEDs are common-cathode LED.

Advantagely, the display driver comprises a third driver connected to the output end of the filter for driving the display module to display the first and second charge status, and the display module comprises a third LED driven by the third driver, and a current-limiting resistor connected between the anode of the third LED and the power supply.

The second objective of this invention is to provide a charge status indicator which comprises a detecting chip for monitoring charge status connected between the primary winding of transformer and ground, and a display module used for displaying the charge status, wherein, said detecting chip for monitoring charge status comprising:

a detecting module for detecting the charging state of the charge power supply;

a comparing module for determining the current charge status based on the detected charging state.

Advantagely, said detecting chip for monitoring charge status further comprises a display driver for driving the display module to display the charge status based on the current charge status.

Advantagely, said detecting module further comprises:

a frequency obtaining unit for obtaining the working frequency of the detecting chip for monitoring charge status, wherein, the working frequency is proportional to the charging current;

a frequency-electrical signal converter for converting the working frequency to an electrical signal which is proportional to the charging current.

Advantagely, said detecting module further comprises:

a sample and hold circuit for sampling electrical signal from the primary auxiliary winding of the transformer;

an error amplifier for comparing the sample electrical signal with a reference value and outputting an electrical signal which is proportional to the charging current.

Advantagely, said comparing module comprises a comparator and a filter, wherein, the forward input end of the comparator is connected to the detecting module to obtain an electrical signal which is proportional to the charging current; the reverse input end of the comparator is connected to a reference electrical signal, the output end of the comparator is connected to the input end of the filter, and the output end of the filter is connected to the display driver to output the charging state.

Advantagely, said display driver comprises a first driver connected to the output end of the filter for driving the display module to display the first charge status, and a second driver connected to the output end of the filter for driving the display module to display the second charge status.

Advantagely, the display module comprises a first LED driven by the first driver, a second LED driven by the second driver, and a current-limiting resistor connected between the anodes of the first and second LEDs and the power supply.

Advantagely, the first and second LEDs are common-anode LED.

Advantagely, the display module comprises a first LED driven by the first driver, a second LED driven by the second driver, and a current-limiting resistor connected between the cathodes of the first and second LED and the ground.

Advantagely, the first and second LEDs are common-cathode LED.

Advantagely, the display driver comprises a third driver connected to the output end of the filter for driving the display module to display the first and second charge status, and the display module comprises a third LED driven by the third driver, and a current-limiting resistor connected between the anode of the third LED and the power supply.

By employing the charger or the charge status indicator for a charger, a primary-side feedback control Flyback SMPS may be employed, just a simple and reliable circuit is needed, and higher power conversion efficiency can be achieved.

BRIEF DESCRIPTION OF THE DRAWINGS

So as to further explain the invention, an exemplary embodiment of the present invention will be described with reference to the below drawings, wherein.

DETAILED DESCRIPTION OF THE PREFERRED EMBODIMENT

These and other advantage, aspect and novel features of the present invention, as well as details of an illustrated embodiment thereof, will be more fully understand from the following description and drawings. While various embodiments of the present invention has been presented by way of example only, and not limitation.

Figure 1:
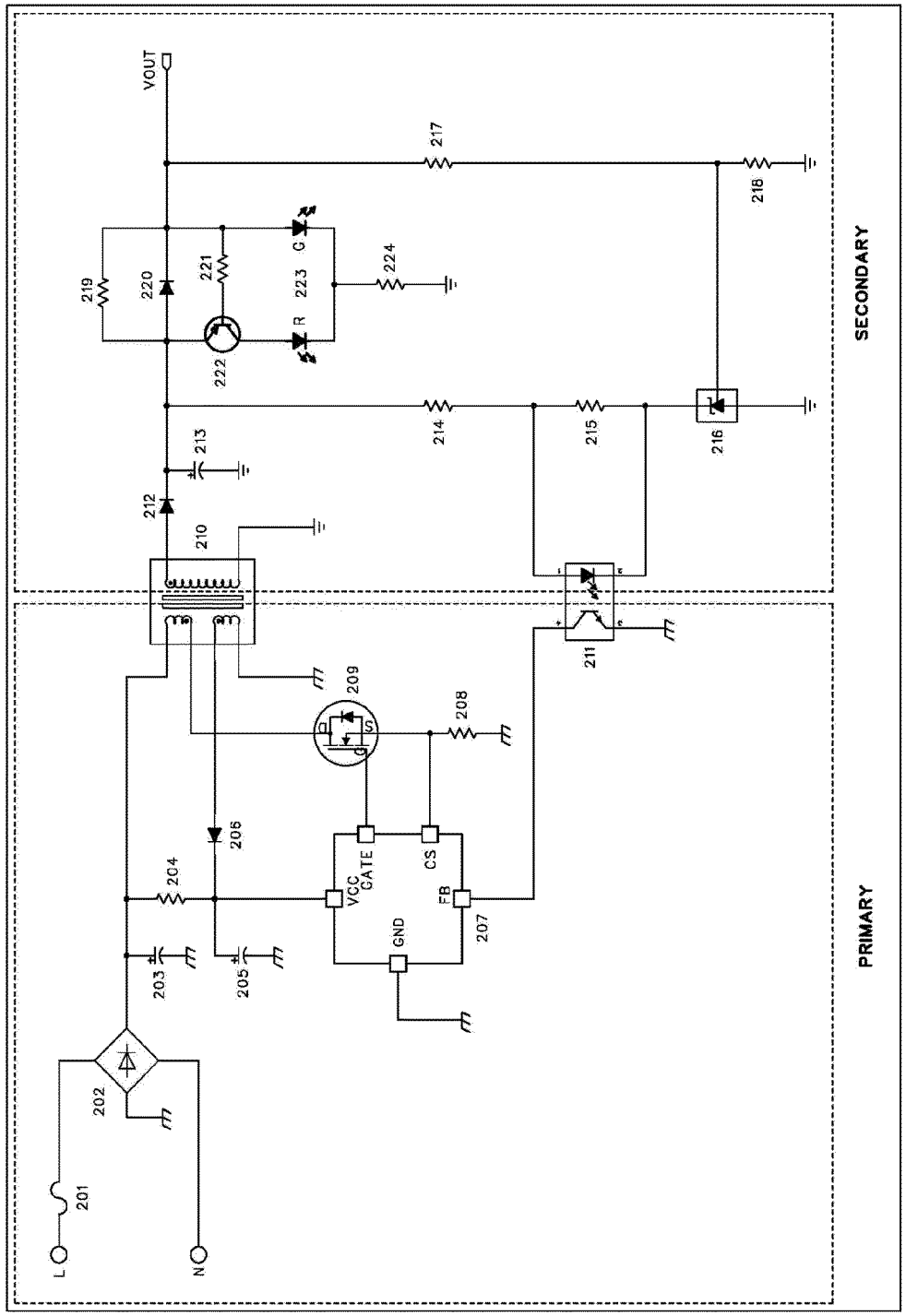
FIG. 1 is the circuit diagram of the charger according to the prior art.
Figure 2:
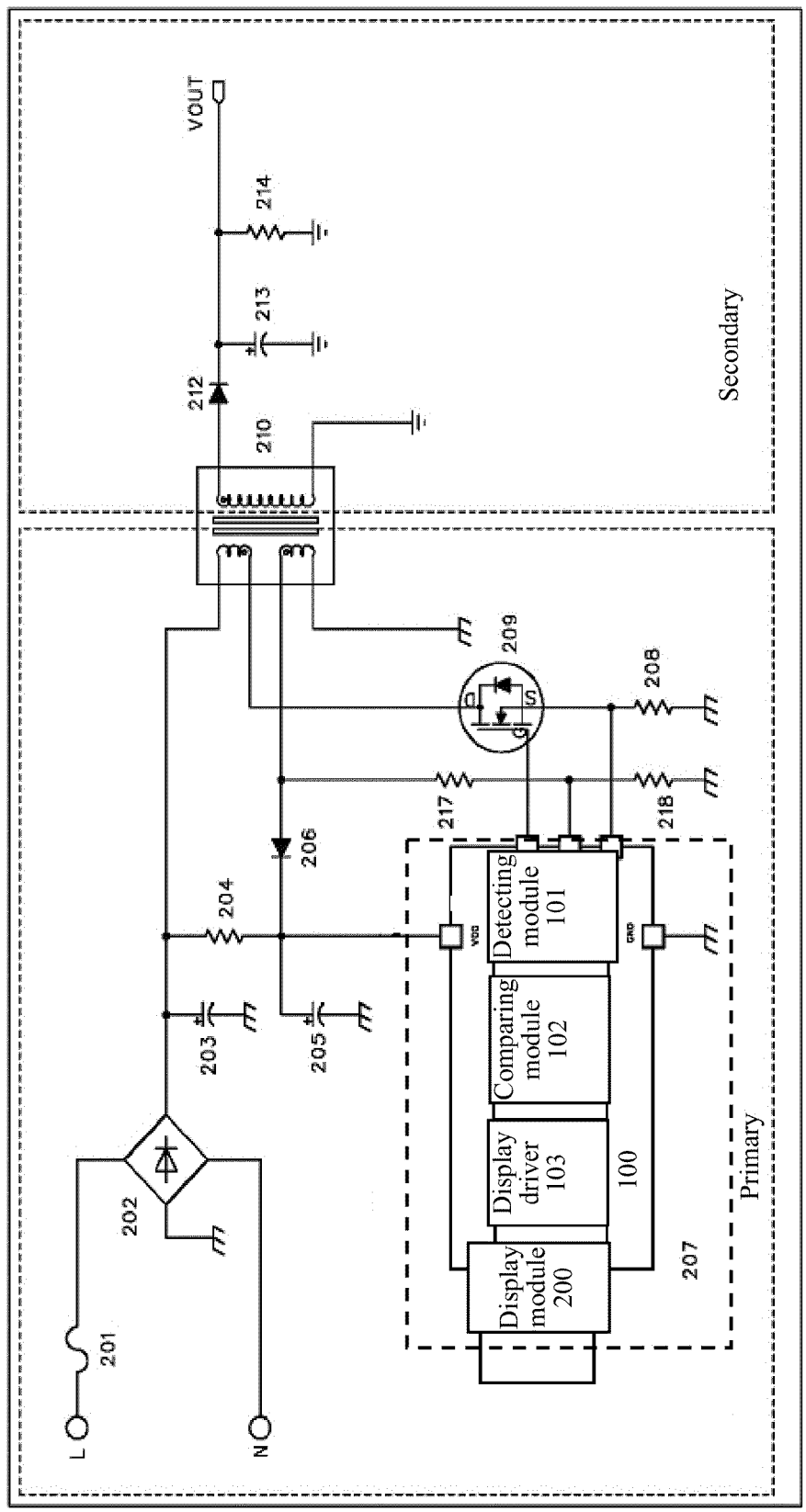
FIG. 2 is the circuit diagram of the charger according to the first embodiment of the present invention.

FIG. 2 is the circuit diagram of the charger according to the first embodiment of the present invention. Referring FIG. 2, the charger according with the present invention comprises a charging power supply and a charge status indicator. The charge status indicator comprises a detecting chip for monitoring charge status 100 connected between the primary winding of transformer and ground, and a display module 200 used for displaying the charge status. Wherein, said detecting chip for monitoring charge status 100 comprises a detecting module 101 for detecting the charging state of the charge power supply and a comparing module 102 for determining the current charging status based on the detected charging state.

In the embodiment disclosed in FIG. 2, the FB end of the detecting chip for monitoring charge status 100 is connected to the anode of the diode D206 through resistor R217, and the cathode of the diode D206 is grounded through capacitor C205. At the same time, the anode of the diode D206 is connected to one end of the primary auxiliary winding of the transformer. The other end of the primary auxiliary winding of the transformer is grounded. The CS end of the detecting chip for monitoring charge status 100 is connected to the source of Power Switch 209; the gate of the Power Switch 209 is connected to the output end of the detecting chip 100 for monitoring charge status, that is, the Gate end. The drain of the Power Switch 209 is connected to one end of the primary winding of the transformer. The other end of the primary winding of the transformer is connected to the input voltage.

In the embodiment disclosed in FIG. 2, the detecting chip for monitoring charge status 100 also comprises a display driver 103 for driving the display module 200 to display the charge status based on the current charge status. As shown in FIG. 2, the detecting module 101 can be used to detect the output current of the charging power supply, and so as to monitor the charging state of the charging power supply, and then feedback the current charging state to the comparing module 102. The comparing module 102 is an information processing module, which can be used to compare the current charging state feedback from detecting module 101 with a predefined charging state, so as to determine the current charging state of the charger. The predefined charging state may be preset. One skilled in the art may set this predefined charging state according to the actual situation.

For example, when the electrical signal obtained by detecting module 101 is the secondary output current, the comparing module 102 will compare this secondary output current with the one tenth-one eighth of the rating current. When the secondary output current is lower than the one tenth or one eighth of the predefined current, the current charge status is set to be the first charge status. The display driver 103 receiving the first charge status signal and drive the display module 200 to display the first charge status. When the secondary output current is higher than the one tenth or one eighth of the rating current, the current charge status is then set to be the second charge status. The display driver 103 receiving the second charge status signal and drive the display module 200 to display the second charge status. In another simplified embodiment according to present invention, the display module may receive and display the charge status directly, so no display driver is needed.

Figure 3:
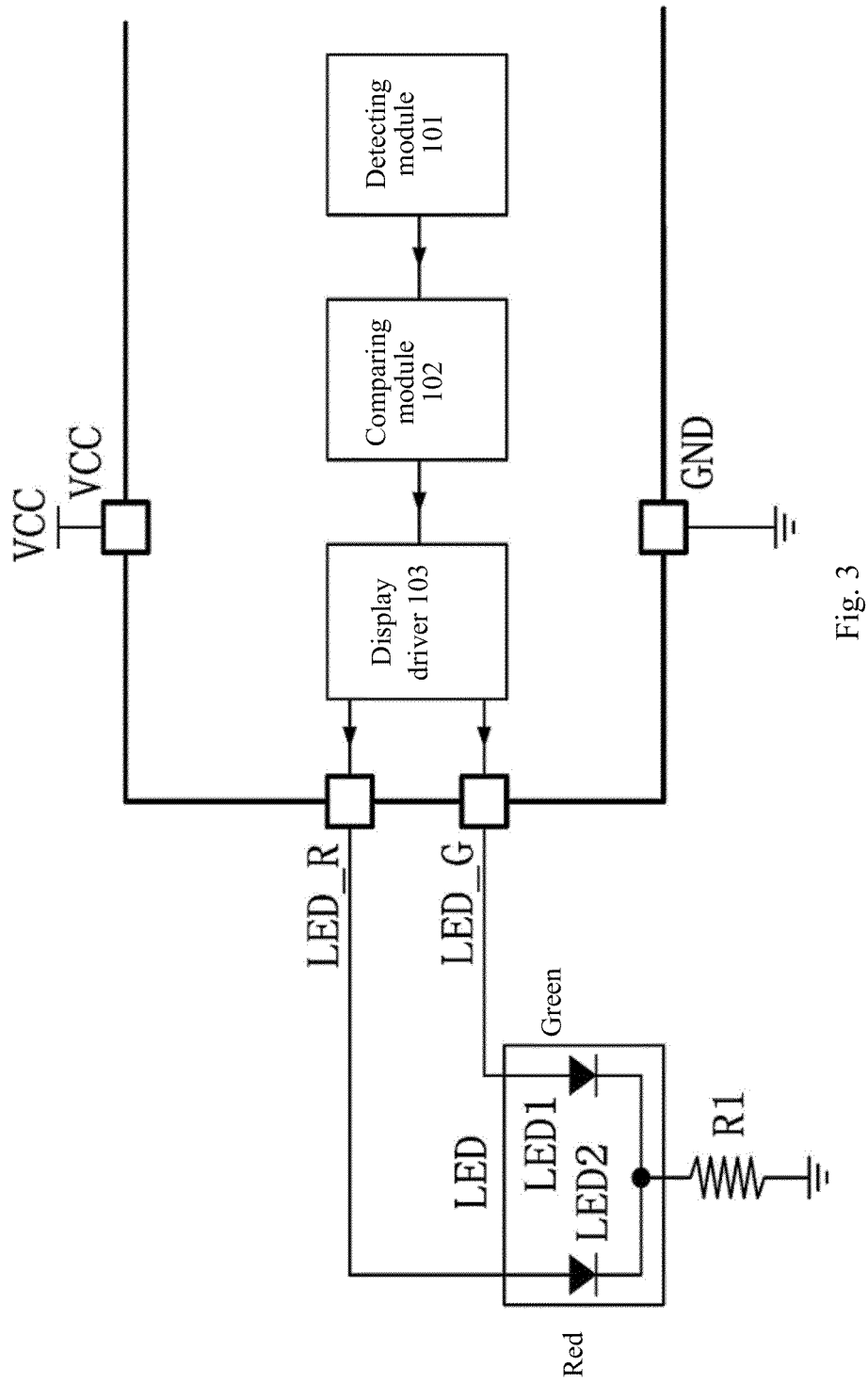
FIG. 3 is the circuit diagram of the first embodiment of the status indicating part of the charge status indicator according to the present invention.

FIG. 3 is the circuit diagram of the first embodiment of the status indicating part of the charge status indicator according to the present invention. As shown in FIG. 3, the display module 200 comprises a red LED, a green LED, and a current-limiting resistor R1 connected between the cathode of the red and green LEDs and ground. The anode of the red LED is connected to the LED_R pin of the display driver 103, the anode of the green LED is connected to the LED_G pin of the display driver 103, and the cathode of both the red LED and the green LED are grounded through the resistor R1.

In the present invention, when the comparing module 102 determine the current charge status is the second charge status, the LED_R pin of the display driver 103 output high level, and the red LED is lighten. When the comparing module 102 determine the current charge status is the first charge status, the LED_G pin of the display driver 103 output high level, and the green LED is lighten.

Figure 4:
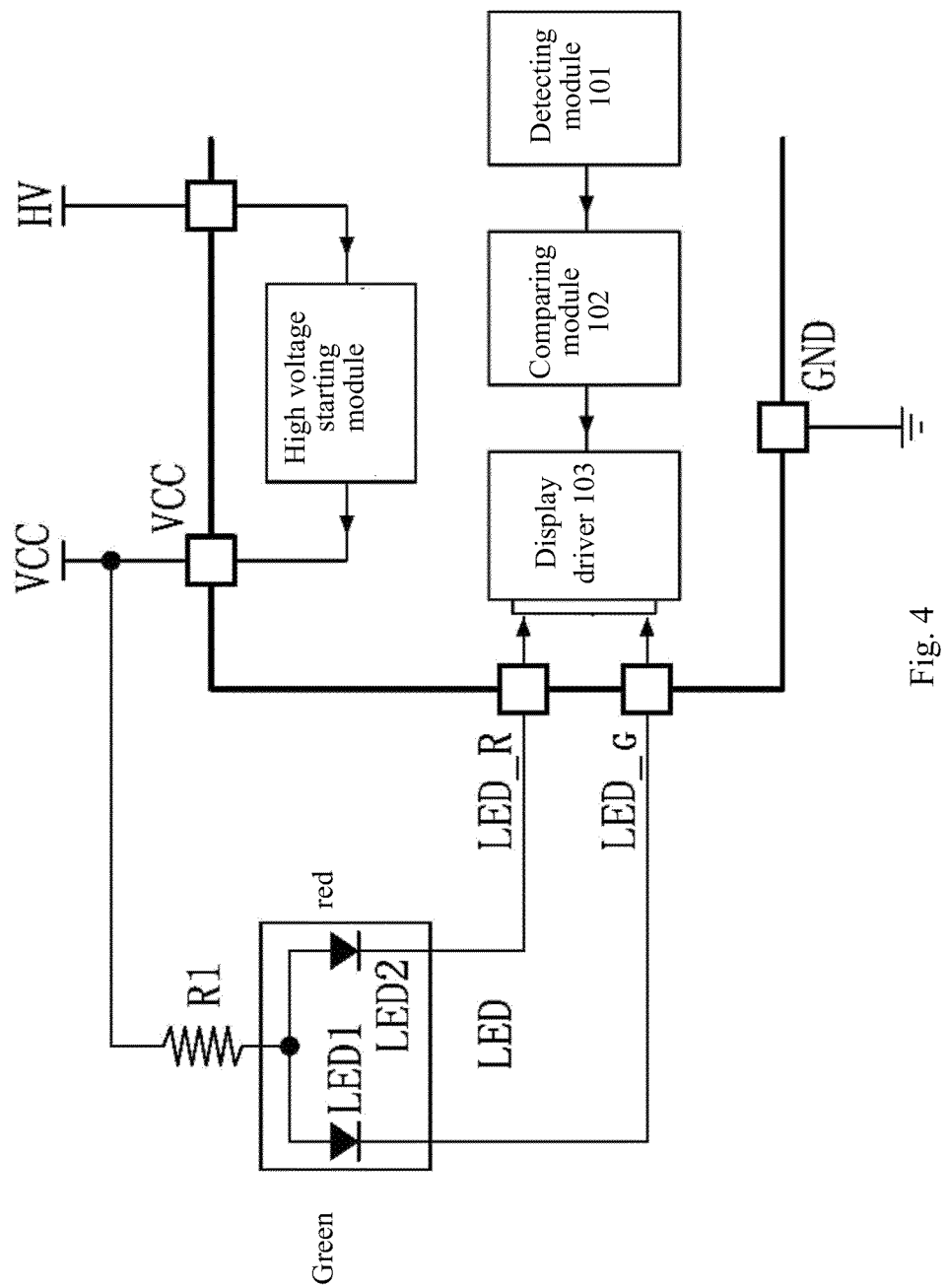
FIG. 4 is the circuit diagram of the second embodiment of the status indicating part of the charge status indicator according to the present invention.

FIG. 4 is the circuit diagram of the second embodiment of the status indicating part of the charge status indicator according to the present invention. Referring to FIG. 4, when the comparing module 102 inside the chip output the second charge status, the LED_R pin output low level, and the LED_G pin output high level, so red LED is lighten, and the green LED isn't lighten or only slightly lighten. When the comparing module 102 inside the chip output the first charge status, the LED_G pin output low level, and the LED_R pin output high level, so green LED is lighten, and the red LED isn't lighten or only slightly lighten. Resistor R1 is the current-limiting resistor for LED, and the red and green LEDs are common-anode LEDs. As shown in FIG. 4, the detecting chip for monitoring charge status 100 also comprises a high voltage starting module for providing high starting voltage to the common-anode LEDs.

Figure 5:
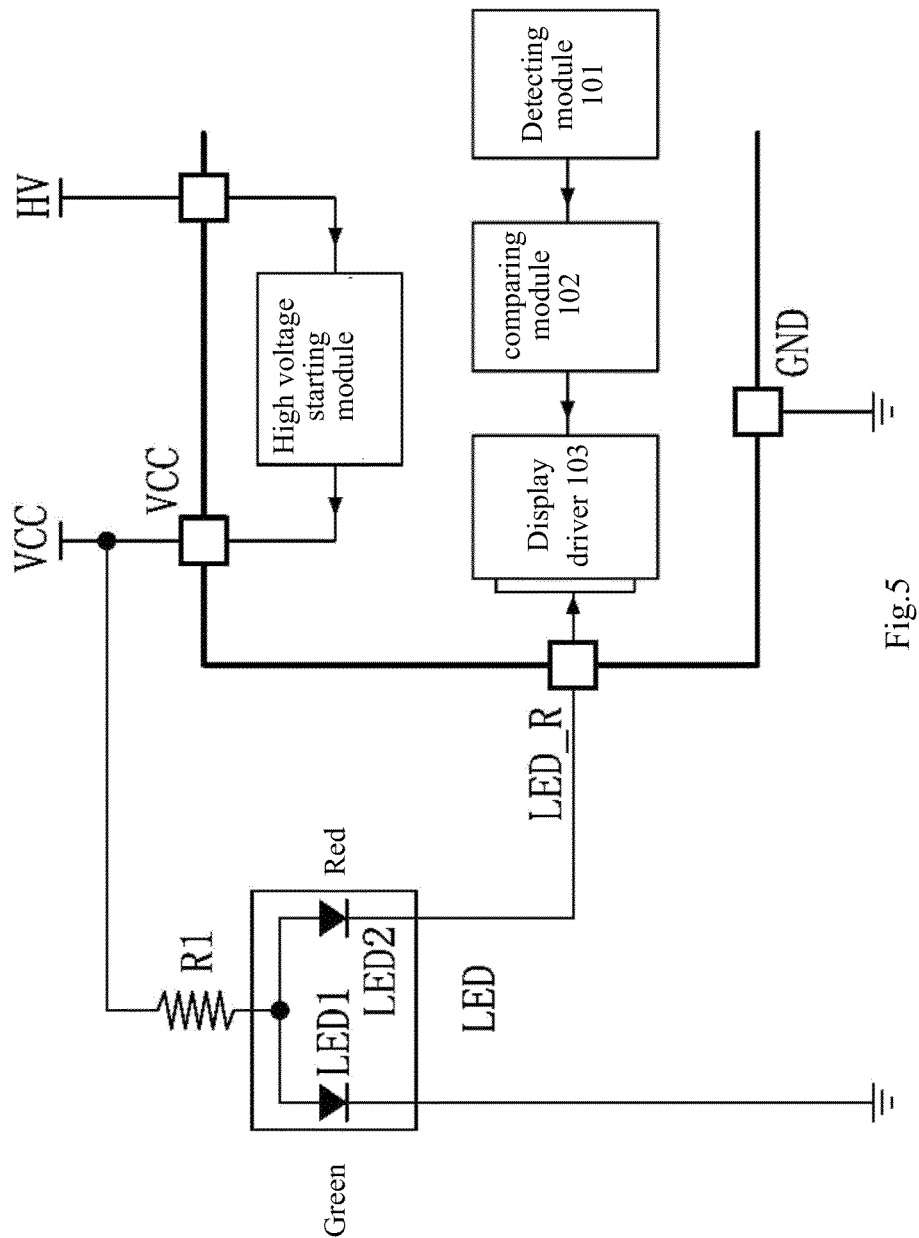
FIG. 5 is the circuit diagram of the third embodiment of the status indicating part of the charge status indicator according to the present invention.

FIG. 5 is the circuit diagram of the third embodiment of the status indicating part of the charge status indicator according to the present invention. Referring to FIG. 5, when the comparing module 102 determine the current charge status is the second charge status, the LED_R pin of the display driver 103 output low level, as a result the red and green LED is lighten together. When the comparing module 102 determines the current charge status is the first charge status, the LED_R pin of the display driver 103 output high level, as a result the green LED is lighten, and the red LED isn't lighten or only slightly lighten. As shown in FIG. 5, the detecting chip for monitoring charge status 100 also comprises a high voltage starting module for providing high starting voltage to the common-anode LEDs.

Figure 6:
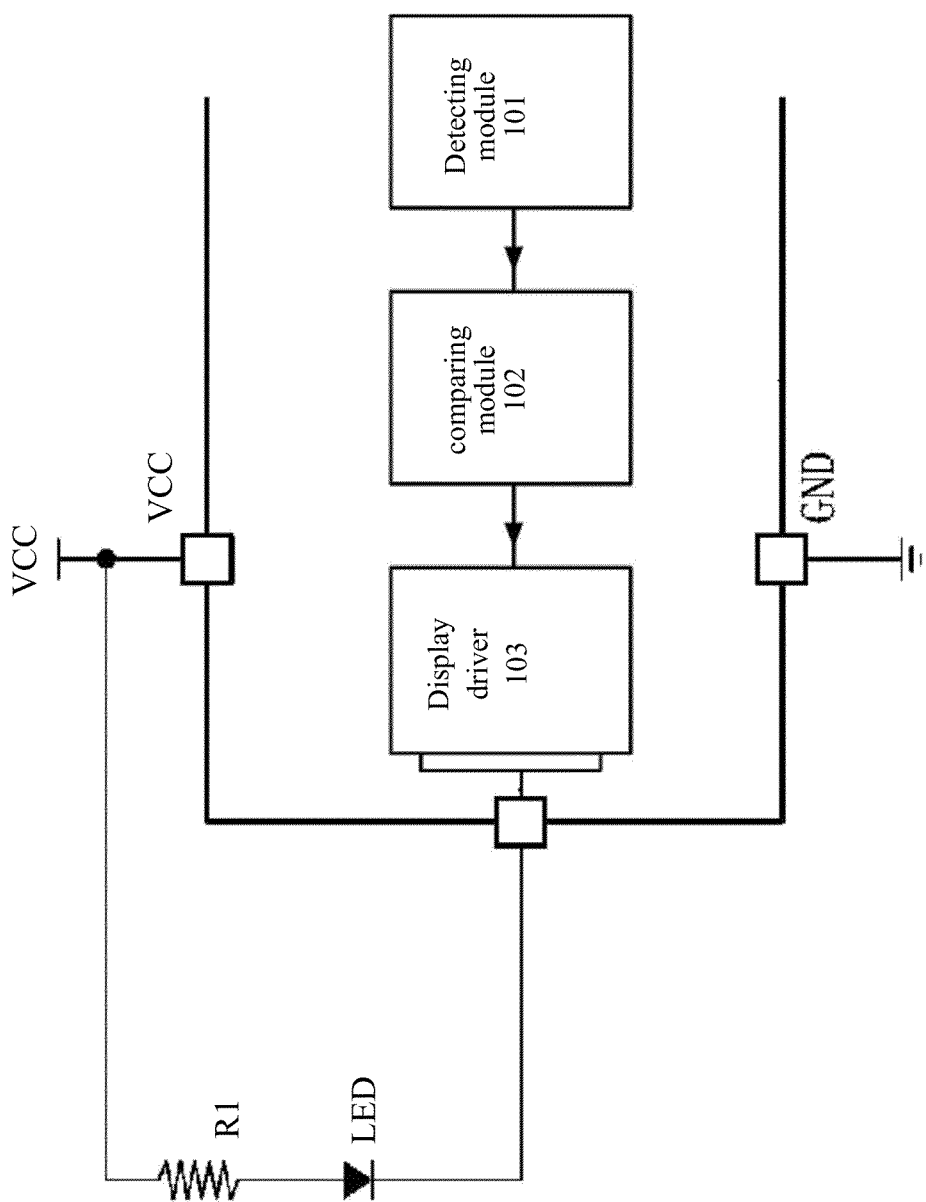
FIG. 6 is the circuit diagram of the fourth embodiment of the status indicating part of the charge status indicator according to the present invention.

FIG. 6 is the circuit diagram of the fourth embodiment of the status indicating part of the charge status indicator according to the present invention. As shown in FIG. 6, the display module 200 comprises a LED, a resistor R1, the anode of the LED is connected to the power supply Vcc through the resistor R1, the cathode of the LED is connected to the LED pin of the display driver 103. When the comparing module 102 determines the current charge status is the second charge status, the LED pin of the display driver 103 output low level, as a result the LED is lighten. When the comparing module 102 determines the current charge status is the first charge status, the LED pin of the display driver 103 output high level, as a result the green LED isn't lighten. In another embodiment, vice versa.

In the other embodiment of the present invention, the red LED may indicate large charging output current (that is the second charge status), and the green LED may indicate small charging output current (that is the first charge status). Alternatively, a monochrome LED may be used to indicate the large and small charging output current separately by flashing or not.

Figure 7:
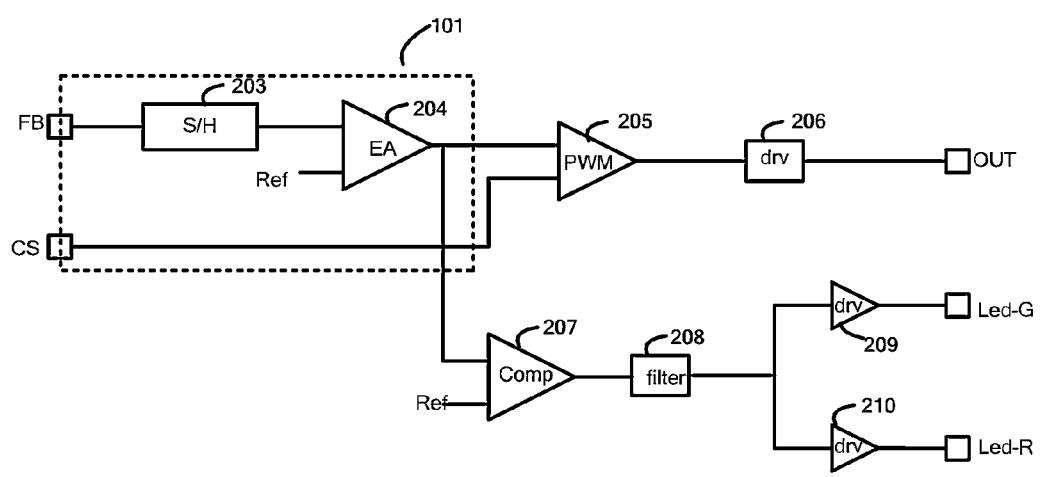
FIG. 7 is a principle block diagram of the first embodiment of the charge status indicator which adapt to the status indicating part disclosed in FIGS. 3 and 4.

FIG. 7 is a principle block diagram of the first embodiment of the charge status indicator which adapt to the status indicating part disclosed in FIGS. 3 and 4. In such embodiment, this charge status indicator is applied in a PWM control charging system. As shown in FIG. 7, the detecting module 101 comprises a sample and hold circuit 203 and an error amplifier 204. The comparing module 102 comprises a comparator 207 and a filter 208. The display driver 102 comprises a first driver 209 and a second driver 210. The first driver 209 is connected to the LED_G pin of the detecting chip 100 for monitoring charge status, and the second driver 210 is connected to the LED_R pin of the detecting chip 100 for monitoring charge status.

The sample and hold circuit 203 is used to obtain sampling voltage from the FB end of the detecting chip 100 for monitoring charge status.

The error amplifier 204 is used for comparing the sample voltage with a preset reference value and output a voltage which is proportional to the charging current. As it is in the PWM control system, the work frequency of the chip is constant, so the charging current of the charging power supply is proportional to the output voltage of the error amplifier 204.

The comparator 207 is a voltage comparator, the forward input end of which is connected to the output end of the error amplifier 204, and the reverse input end is connected to a reference voltage, so as to compare the output voltage of error amplifier 204 with the preset reference voltage. Once the reference voltage is determined, the output results of comparator 207 represent the current charging state. In order to make sure the accuracy of the output results of comparator 207, filter 208 is used to low pass filter the output results.

In another embodiment according to the present invention, the sample and hold circuit 203 may simple a current signal or a power signal, and then the error amplifier 204 is used to convert it into a voltage which is proportional to the charging current. One skilled in the art knows that different device can be employed to convert different signal to voltage, current or power signal which is proportional to the charging current, and then deliver such signal to comparator 207 for comparing. Accordingly, an appropriate voltage, current or other electrical signal comparator also may be adopted.

When the filter 208 output the first charge status, the first driver 209 receive the first charge status signal and drive the green LED to emit green light, and when the filter 208 output the second charge status, the second driver 210 receive the second charge status signal and drive the red LED to emit red light.

In such embodiment, the detecting chip for monitoring charge status 100 further comprises a PWM control unit, which comprises a PWM comparator 205 and a PWM output driver 206. The output end of the PWM output driver 206 is connected to the gate of the power switch to control the working state of the power switch.

Figure 8:
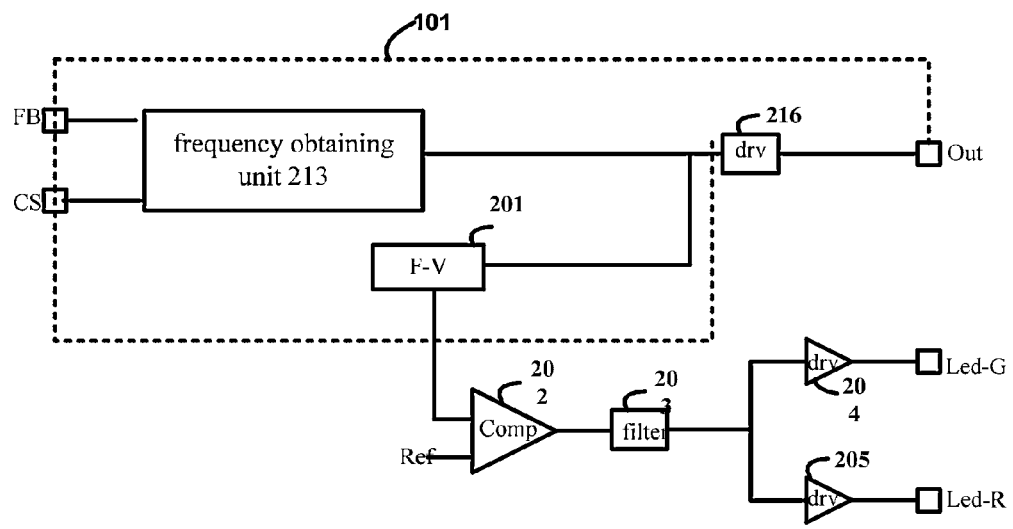
FIG. 8 is a principle block diagram of the second embodiment of the charge status indicator which adapt to the status indicating part disclosed in FIGS. 3 and 4.

FIG. 8 is a principle block diagram of the second embodiment of the charge status indicator which adapt to the status indicating part disclosed in FIGS. 3 and 4. In such embodiment, the charge status indicator is adopted in a PFM control charging system. Wherein, the detecting module 101 comprises a frequency obtaining unit 213 and a frequency-voltage converter 201. The frequency obtaining unit 213 is used for obtaining the working frequency of the detecting chip 100 for monitoring charge status, wherein, the working frequency is proportional to the charging current. One skilled in the art knows various methods for obtaining the working frequency of a PFM control system, and each of them can be used in present invention. The frequency-voltage converter 201 is used for converting the working frequency to a voltage which is proportional to the working frequency, and such voltage is proportional to the charging current, that is, the smaller the output voltage of the frequency-voltage converter 201 is, the lower the working frequency is, that is, the smaller the charging current is.

The comparator 202 is a voltage comparator, the forward input end of which is connected to the output end of the frequency-voltage converter 201, and the reverse input end is connected to a reference voltage, so as to compare the output voltage of frequency-voltage converter 201 with the preset reference voltage. In order to make sure the accuracy of the output results of comparator 202, filter 208 is used to low pass filter the output results.

When the filter 208 output the first charge status, the first driver 204 receive the first charge status signal and drive the green LED to emit green light, and when the filter 208 output the second charge status, the second driver 205 receive the second charge status signal and drive the red LED to emit red light.

Although in such embodiment, the red LED may indicate large charging output current (that is the second charge status), and the green LED may indicate small charging output current (that is the first charge status). In the other embodiment of the present invention, a monochrome LED may be used to indicate the large and small charging output current separately by flashing or not. Moreover, a monochrome LED may be used to indicate the large and small charging output current separately by lighting for a long time or flashing. Based on the teaching of the present invention, other method may be employed to distinguish different charging states; all of these are included by the present invention.

In another embodiment of the present invention, the detecting module 101 is a frequency-current converter, which can be used to convert the working frequency of the detecting chip for monitoring charge status 100 which is proportional to the charging current to a current which is proportional to the charging current. Meanwhile, the comparator 202 is a current comparator, the forward input end of which is connected to the output end of the frequency current converter 201, and the reverse input end is connected to a reference current, so as to compare the output current of frequency-current converter 201 with the preset reference current. In order to make sure the accuracy of the output results of comparator 202, filter 208 is used to low pass filter the output results. In one embodiment according to present invention, the reference current may be $1/10$-$1/8$ of the rated current.

Although the frequency-electrical signal converter is explained as a frequency-voltage converter and frequency-current converter. However, based on the teach of the present invention, one skilled in the art may find out that, other electrical signals, such as average power, instant power and other electrical signal which is proportional to the charging current can be adopted, and corresponding reference signal may be employed for determining.

Figure 9:
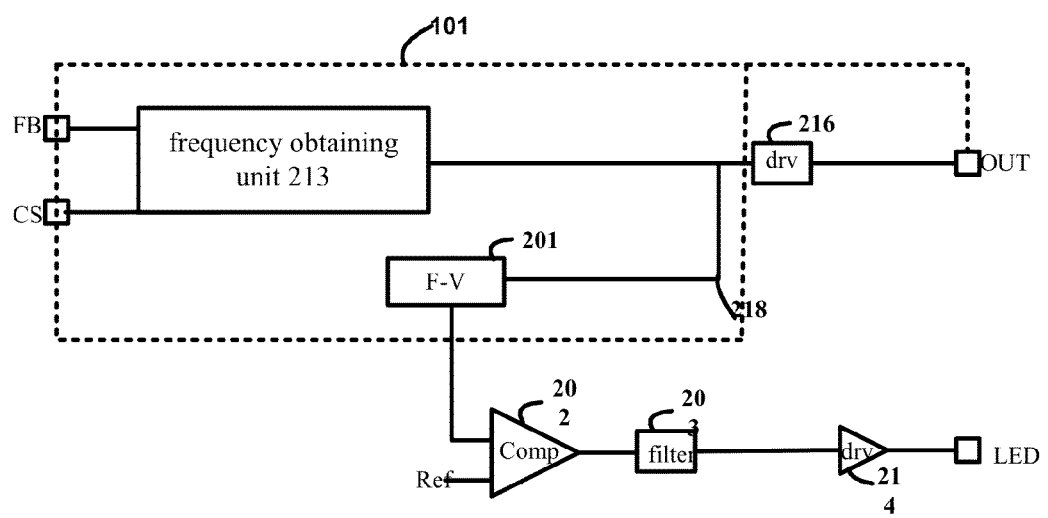
FIG. 9 is a principle block diagram of the first embodiment of the charge status indicator which adapt to the status indicating part disclosed in FIGS. 5 and 6.
Figure 10:
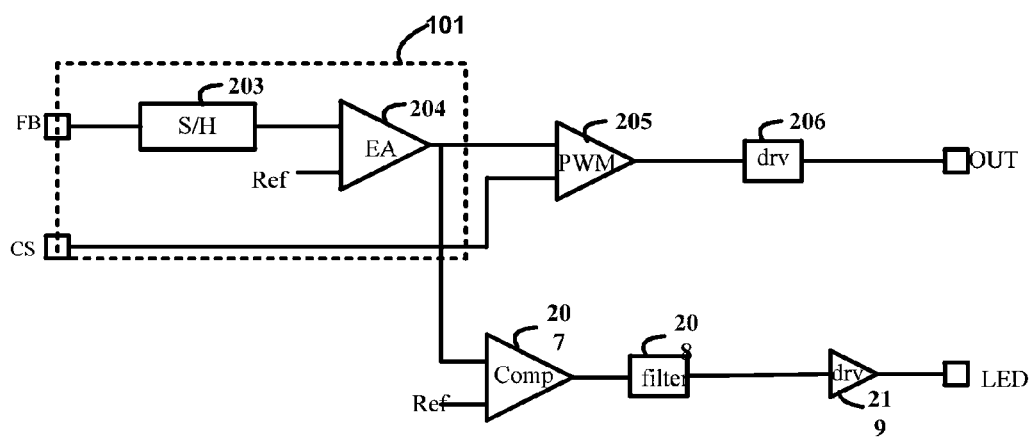
FIG. 10 is a principle block diagram of the second embodiment of the charge status indicator which adapt to the status indicating part disclosed in FIGS. 5 and 6.

FIG. 9 is a principle block diagram of the first embodiment of the charge status indicator which adapt to the status indicating part disclosed in FIGS. 5 and 6. FIG. 10 is a principle block diagram of the second embodiment of the charge status indicator which adapt to the status indicating part disclosed in FIGS. 5 and 6. It can be seen from the Figures that, FIG. 9 is basically the same as FIG. 8 only with the difference that, in the display driver of FIG. 9, only driver 214 is provided, so it is applicable in FIGS. 5 and 6, in which, a display module with one LED is disclosed. Similarly, FIG. 10 is basically the same as FIG. 7 only with the difference that, in the display driver of FIG. 10, only driver 219 is provided, so it is applicable in FIGS. 5 and 6 in which, a display module with one LED is disclosed.

The foregoing description is just the preferred embodiment of the invention. It is not intended to exhaustive or to limit the invention. Any modifications, variations, and amelioration without departing from the spirit and scope of the present invention should be included in the scope of the prevent invention.

The invention claimed is:

1. A charger, comprising: a charging power supply and a charge status indicator, wherein the charge status indicator comprises a detecting chip for monitoring charge status connected between the primary winding of transformer and ground, and a display module used for displaying the charge status, wherein said detecting chip for monitoring the charge status comprises:
   a detecting module for detecting the charging state of the charge power supply;
   a comparing module for determining the current charge status based on the detected charging state; and
   a display driver for driving the display module to display the charge status based on the current charge status; and
   wherein said detecting module comprises:
   a frequency obtaining unit for obtaining the working frequency of said detecting chip for monitoring the charge status, wherein the working frequency is proportional to the charging current; and
   a frequency-electrical signal converter for converting the working frequency to an electrical signal which is proportional to the charging current.

2. The charger according to claim 1, wherein said detecting module further comprises:
   a sample and hold circuit for sampling electrical signal from the primary auxiliary winding of the transformer; and
   an error amplifier for comparing the sample electrical signal with a reference value and outputting an electrical signal which is proportional to the charging current.

3. The charger according to claim 1, wherein said comparing module comprises a comparator and a filter, wherein the forward input end of the comparator is connected to the detecting module to obtain an electrical signal which is proportional to the charging current; the reverse input end of the comparator is connected to a reference electrical signal, the output end of the comparator is connected to the input end of the filter, and the output end of the filter is connected to the display driver to output the charging state.

4. The charger according to claim 3, wherein said display driver comprises a first driver connected to the output end of the filter for driving the display module to display the first charge status, and a second driver connected to the output end of the filter for driving the display module to display the second charge status.

5. The charger according to claim 4, wherein the display module comprises a first LED driven by the first driver, a second LED driven by the second driver, and a current-limiting resistor connected between the anodes of the first and second LEDs and the power supply; and wherein the first and second LEDs are common-anode LED.

6. The charger according to claim 4, wherein the display module comprises a first LED driven by the first driver, a second LED driven by the second driver, and a current-limiting resistor connected between the cathodes of the first and second LED and the ground; and wherein the first and second LEDs are common-cathode LED.

7. The charger according to claim 3, wherein the display driver comprises a third driver connected to the output end of the filter for driving the display module to display the first and second charge status, and the display module comprises a third LED driven by the third driver, and a current-limiting resistor connected between the anode of the third LED and the power supply.

8. A charge status indicator, comprising: a detecting chip for monitoring charge status connected between the primary winding of transformer and ground, and a display module used for displaying the charge status, wherein said detecting chip for monitoring the charge status comprises:
  a detecting module for detecting the charging state of the charge power supply;
  a comparing module for determining the current charge status based on the detected charging state; and
  a display driver for driving the display module to display the charge status based on the current charge status; and
  wherein said detecting module comprises:
  a frequency obtaining unit for obtaining the working frequency of said detecting chip for monitoring the charge status, wherein the working frequency is proportional to the charging current; and
  a frequency-electrical signal converter for converting the working frequency to an electrical signal which is proportional to the charging current.

9. The charge status indicator according to claim 8, wherein said detecting module further comprises:
  a sample and hold circuit for sampling electrical signal from the primary auxiliary winding of the transformer; and
  an error amplifier for comparing the sample electrical signal with a reference value and outputting an electrical signal which is proportional to the charging current.

10. The charge status indicator according to claim 8, wherein said comparing module comprises a comparator and a filter, wherein the forward input end of the comparator is connected to the detecting module to obtain an electrical signal which is proportional to the charging current; the reverse input end of the comparator is connected to a reference electrical signal, the output end of the comparator is connected to the input end of the filter, and the output end of the filter is connected to the display driver to output the charging state.

11. The charge status indicator according to claim 10, wherein said display driver comprises a first driver connected to the output end of the filter for driving the display module to display the first charge status, and a second driver connected to the output end of the filter for driving the display module to display the second charge status.

12. The charge status indicator according to claim 11, wherein the display module comprises a first LED driven by the first driver, a second LED driven by the second driver, and a current-limiting resistor connected between the anodes of the first and second LEDs and the power supply; and wherein the first and second LEDs are common-anode LED.

13. The charge status indicator according to claim 11, wherein the display module comprises a first LED driven by the first driver, a second LED driven by the second driver, and a current-limiting resistor connected between the cathodes of the first and second LED and the ground; and wherein the first and second LEDs are common-cathode LED.

14. The charge status indicator according to claim 10, wherein the display driver comprises a third driver connected to the output end of the filter for driving the display module to display the first and second charge status, and the display module comprises a third LED driven by the third driver, and a current-limiting resistor connected between the anode of the third LED and the power supply.

* * * * *